US008675372B2

(12) United States Patent
Saimen (10) Patent No.: US 8,675,372 B2
(45) Date of Patent: Mar. 18, 2014

(54) ELECTROOPTIC SUBSTRATE, ELECTROOPTIC DEVICE, AND ELECTRONIC APPARATUS

(75) Inventor: Munehide Saimen, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 225 days.

(21) Appl. No.: 13/418,545

(22) Filed: Mar. 13, 2012

(65) Prior Publication Data

US 2012/0236514 A1    Sep. 20, 2012

(30) Foreign Application Priority Data

Mar. 15, 2011  (JP) ................................. 2011-056435

(51) Int. Cl.
 *H05K 1/11* (2006.01)
 *H05K 1/14* (2006.01)
 *H05K 1/00* (2006.01)
(52) U.S. Cl.
 USPC .......................................... 361/803; 361/749
(58) Field of Classification Search
 USPC ............ 361/749, 748, 679.01, 600, 800, 803; 174/254, 260, 262; 257/88; 349/149–152
 See application file for complete search history.

(56) References Cited

U.S. PATENT DOCUMENTS

| | | | | |
|---|---|---|---|---|
| 6,259,505 B1 * | 7/2001 | Makino | | 349/153 |
| 6,291,274 B1 * | 9/2001 | Oida et al. | | 438/123 |
| 6,407,796 B2 | 6/2002 | Tajima et al. | | |
| 6,690,089 B2 * | 2/2004 | Uchida | | 257/686 |
| 7,071,555 B2 * | 7/2006 | Kim et al. | | 257/738 |
| 7,239,164 B2 * | 7/2007 | Tamaki | | 257/686 |
| 2011/0122356 A1 * | 5/2011 | Saimen | | 349/149 |

FOREIGN PATENT DOCUMENTS

| | | |
|---|---|---|
| JP | 10-214858 A | 8/1998 |
| JP | 2000-242194 A | 9/2000 |

* cited by examiner

*Primary Examiner* — Jenny L Wagner
*Assistant Examiner* — Ahmad D Barnes
(74) *Attorney, Agent, or Firm* — ALG Intellectual Property, LLC (57) ABSTRACT

In at least one embodiment of the disclosure, an electrooptic device includes first and second mounting terminals arranged on a terminal portion to be aligned in a direction intersecting with a side of the electrooptic substrate. A first flexible substrate is connected to the first mounting terminal. A second flexible substrate is connected to the second mounting terminal and arranged to be superimposed on the first flexible substrate. A resin member covers the first flexible substrate, the second flexible substrate and the electrooptic substrate.

6 Claims, 9 Drawing Sheets

ELECTROOPTIC SUBSTRATE, ELECTROOPTIC DEVICE, AND ELECTRONIC APPARATUS

CROSS-REFERENCE

The present application claims priority from Japanese Patent Application No. 2011-056435 filed on Mar. 15, 2011 which is hereby incorporated by reference in its entirety.

BACKGROUND

A chip on film (COF) method is a method in which a data line control circuit or a scan line control circuit is mounted on a flexible substrate formed with polyimide or the like in a film form and the flexible substrate is bonded to a terminal (hereinafter, referred to "mounting terminal") provided on a terminal portion of an electrooptic substrate through an anisotropic conductive film by thermocompression. Further, when the data line control circuit or the scan line control circuit is mounted on the electrooptic substrate with the COF method, a connection portion between the mounting terminal on the electrooptic substrate and a terminal on the flexible substrate is generally sealed (molded) by a resin or the like. The connection portion between the mounting terminal on the electrooptic substrate and the terminal on the flexible substrate is sealed in order to protect the connection portion from humidity and dusts and reinforce the connection portion.

Further, a configuration in which the data line control circuit or the scan line control circuit is mounted with a TCP method can be employed (for example, see, JP-A-2000-242194). Alternatively, a configuration in which the data line control circuit or the scan line control circuit is arranged on a different substrate and is connected to the electrooptic substrate with a FPC can be employed.

For example, when the data line control circuit is mounted with the COF method, data lines are divided into a plurality of groups such as a right half group and a left half group, for example, and a data line control circuit is mounted on each group, in general. This mode is superior in terms of any of cost and accuracy in comparison with a mode in which driving of all the data lines is controlled by a single data line control circuit. In a mode in which the plurality of data line control circuits (or scan line control circuits) are mounted, mounting terminals for connecting flexible substrates on which the data line control circuits (or scan line control circuits) are mounted are arranged in parallel on a terminal portion along one side of the electrooptic substrate in many cases. Further, there is a large-sized electrooptic substrate for liquid crystal television receiver in which mounting terminals are arranged on a terminal portion in a matrix form.

However, there are problems in the mode in which the data lines (or scan lines) are divided into groups and the data line control circuit (or the scan line control circuit) is mounted on each group. For example, as the number of mounting terminals is increased, time and effort are required for a sealing process so that manufacturing cost is increased. In addition, there also arises a problem that a thickness of the entire electrooptic substrate is increased in the mode in which the mounting terminals for connecting the flexible substrates on which the data line control circuits (or scan line control circuits) are mounted are arranged in a matrix form of 2×2. The problem arises since the flexible substrates which are connected to the mounting terminals arranged in a draw-out direction of the flexible substrates are superimposed on one another, the flexible substrate at an upper side is lifted and a thickness is increased by the amount of elevation of a resin member which seals a connection portion between the flexible substrate at a lower side and the mounting terminal when the flexible substrates are laminated.

SUMMARY

In accordance with certain embodiments of the disclosure, it is possible to provide a technique for simplifying the sealing process of connection portions between flexible substrates and mounting terminals and preventing a thickness, when the flexible substrates are laminated, from being increased on an electrooptic substrate on which driving circuits such as data line control circuits or scan line control circuits are mounted with a COF method, a tape carrier package (TCP) method, a flexible printed circuit (FPC) method, or the like.

An electrooptic substrate according to an aspect of the disclosure includes a terminal portion which is provided on at least one side of the electrooptic substrate, first and second mounting terminals which are arranged on the terminal portion so as to be aligned in a direction intersecting with the one side, a first flexible substrate which is connected to the first mounting terminal, a second flexible substrate which is connected to the second mounting terminal and is arranged so as to be superimposed on the first flexible substrate, a first resin member which covers a first side face of the first mounting terminal, a second resin member which covers a second side face of the first mounting terminal, which is opposed to the first side face, and covers a third side face of the second mounting terminal, which is opposed to the second side face, a third resin member which covers a fourth side face of the second mounting terminal, which is opposed to the third side face. In the electrooptic substrate, the first resin member covers portions of the first flexible substrate and the electrooptic substrate each of which is continuous to the first side face, the second resin member covers portions of the first flexible substrate and the electrooptic substrate each of which is continuous to the second side face and portions of the second flexible substrate and the electrooptic substrate each of which is continuous to the third side face, and the third resin member covers portions of the second flexible substrate and the electrooptic substrate each of which is continuous to the fourth side face.

In the electrooptic substrate, the portions of the first flexible substrate and the electrooptic substrate each of which is continuous to the second side face of the first mounting terminal and the portions of the second flexible substrate and the electrooptic substrate each of which is continuous to the third side face of the second mounting terminal are sealed by a common resin member (second resin member). Therefore, moisture-proofing, dust-proofing, and reinforcement of these portions are realized. Further, since the portions of the first flexible substrate and the electrooptic substrate each of which is continuous to the second side face of the first mounting terminal and the portions of the second flexible substrate and the electrooptic substrate each of which is continuous to the third side face of the second mounting terminal are sealed by a common resin member, a sealing process is simplified in comparison with a mode in which these portions are separately sealed by different resin members. As such, according to an aspect of the disclosure, a process operation time (tact) of the sealing process is shortened with the simplification of the sealing process, thereby reducing manufacturing cost.

In the case in which the portions of the first flexible substrate and the electrooptic substrate each of which is continuous to the second side face of the first mounting terminal and the portions of the second flexible substrate and the electrooptic substrate each of which is continuous to the third side face of the second mounting terminal are separately sealed by different resin members, the second flexible substrate is lifted by elevation of the resin member which seals the former portions and a thickness of the entire electrooptic substrate is increased. However, according to an aspect of the disclosure, the thickness of the entire electrooptic substrate can be also prevented from being increased. Accordingly, according to the aspect of the disclosure, in the electrooptic substrate on which the flexible substrates on which driving control circuits for performing driving control of the data lines or the scan lines are mounted with a COF method, the sealing process of the connection portions between the flexible substrates and the mounting terminals can be simplified so as to reduce manufacturing cost and the thickness of the electrooptic substrate.

In at least one embodiment, the electrooptic substrate further includes a third mounting terminal which is arranged on the terminal portion so as to be aligned with the first mounting terminal in a direction of the one side, a fourth mounting terminal which is arranged on the terminal portion so as to be aligned with the second mounting terminal in the direction of the one side, a third flexible substrate which is connected to the third mounting terminal, and a fourth flexible substrate which is connected to the fourth mounting terminal and is arranged so as to be superimposed on the third flexible substrate. In the electrooptic substrate, the first resin member covers a first side face of the third mounting terminal and covers portions of the third flexible substrate and the electrooptic substrate each of which is continuous to the first side face, the second resin member covers a second side face of the third mounting terminal, which is opposed to the first side face, and a third side face of the fourth mounting terminal, which is opposed to the second side face, and covers portions of the third flexible substrate and the electrooptic substrate each of which is continuous to the second side face and portions of the fourth flexible substrate and the electrooptic substrate each of which is continuous to the third side face, and the third resin member covers a fourth side face of the fourth mounting terminal, which is opposed to the third side face of the fourth mounting terminal, and covers portions of the fourth flexible substrate and the electrooptic substrate each of which is continuous to the fourth side face. As such, the connection portions between the mounting terminals aligned in the direction of the one side and the flexible substrates connected to the mounting terminals are sealed by a common resin member. Therefore, the sealing process can be further simplified so as to reduce manufacturing cost.

Further, in at least one embodiment, the second resin member may be formed with a resin having a low viscosity in comparison with those of the first resin member and the third resin member. According to this aspect of the disclosure, if the resin is coated on the portions of the first flexible substrate and the electrooptic substrate each of which is continuous to the second side face of the first mounting terminal, the resin flows to the portions of the second flexible substrate and the electrooptic substrate each of which is continuous to the third side face of the second mounting terminal so that the above second resin member is formed. Therefore, the second resin member can be formed without largely lifting the second flexible substrate. As such, in the process of forming the second resin member, it is possible that risks associated with the second flexible substrate being stripped off from the second mounting terminal and the electrooptic substrate being broken can be prevented from occurring.

Further, in the electrooptic substrate according to an aspect of the disclosure, the first, second, and third resin members may be formed by coating a resin continuously. Here, a continuous resin coating means that a resin is continuously coated without interruption in a single stroke manner. As such, a coating path of the resin and the sealing process may be simplified so as to reduce cost.

According to another aspect of the disclosure, an electrooptic device may include the above electrooptic substrate and an electronic apparatus may include the electrooptic device as a display unit. As described above, with the electrooptic substrate according to aspects of the disclosure, the sealing process is simplified so as to reduce manufacturing costs. As such, with an electrooptic device including the electrooptic substrate or an electronic apparatus including the electrooptic device as the display unit, manufacturing costs can be reduced in a similar manner.

BRIEF DESCRIPTION OF THE DRAWINGS

Non-limiting and non-exhaustive embodiments of the present disclosure will be described with reference to the accompanying drawings, wherein like numbers reference like elements.

DESCRIPTION OF EXEMPLARY EMBODIMENTS

Hereinafter, embodiments of the disclosure will be described with reference to the accompanying drawings. It is to be understood, however, that other embodiments may be utilized and changes may be made without departing from the scope of the present disclosure. Therefore, the following detailed description is not to be taken in a limiting sense, and the scope of the present disclosure is defined by the appended claims and their equivalents.

Throughout the specification and claims, the following terms take at least the meanings explicitly associated herein, unless the context clearly dictates otherwise. The meanings identified below are not intended to limit the terms, but merely provide illustrative examples for use of the terms. The meaning of "a," "an," "one," and "the" may include reference to both the singular and the plural. Reference in the specification to "one embodiment" or "an embodiment" means that a particular feature, structure, or characteristic described in connection with the embodiment may be included in at least one embodiment of the disclosure. The appearances of the phrases "in one embodiment" or "in an embodiment" in various places in the specification do not necessarily all refer to the same embodiment, but it may.

Several embodiments will sequentially be described under corresponding section headings below. Section headings are merely employed to improve readability, and they are not to be construed to restrict or narrow the present disclosure. For example, the order of description headings should not necessarily be construed so as to imply that these operations are necessarily order dependent or to imply the relative importance of an embodiment. Moreover, the scope of a disclosure under one section heading should not be construed to restrict or to limit the disclosure to that particular embodiment, rather the disclosure should indicate that a particular feature, structure, or characteristic described in connection with a section heading is included in at least one embodiment of the disclosure, but it may also be used in connection with other embodiments.

A. EMBODIMENT

Configuration

Figure 1:
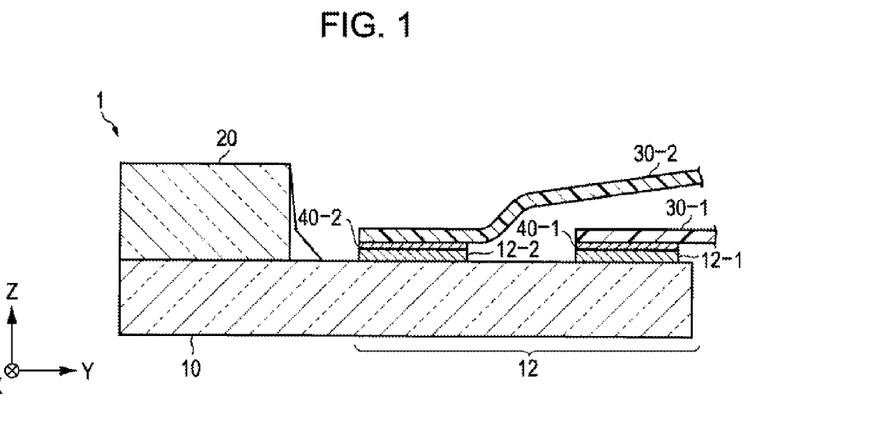
FIG. 1 is a left side view illustrating an electrooptic substrate according to an embodiment of the disclosure.
Figure 2:
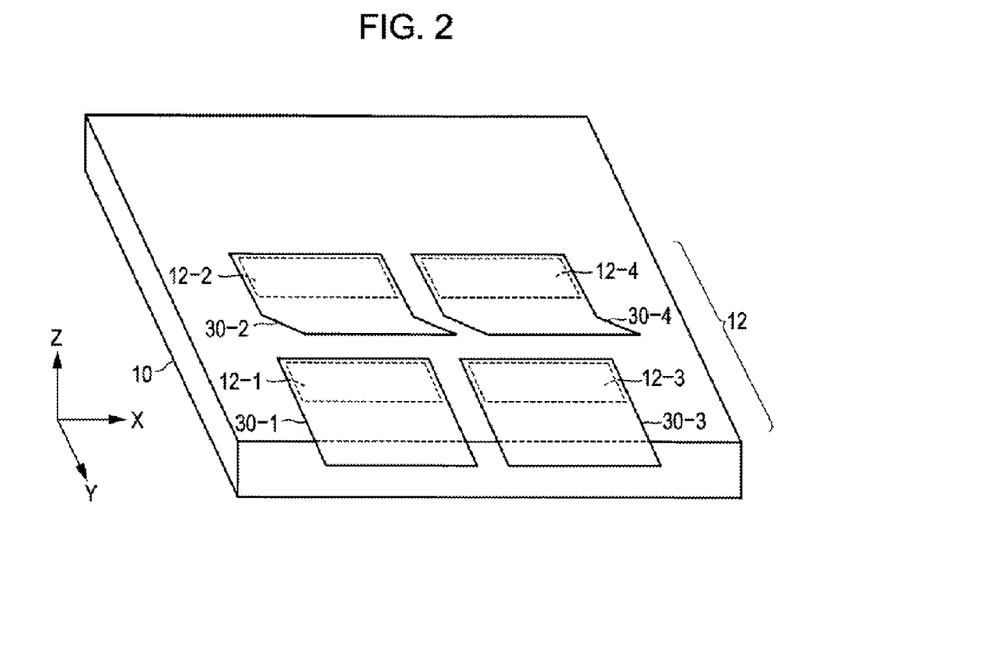
FIG. 2 is a perspective view illustrating the electrooptic substrate.

FIG. 1 is a side view illustrating an electrooptic substrate 1 as an embodiment of the disclosure and FIG. 2 is a perspective view illustrating the electrooptic substrate 1. The electrooptic substrate 1 constitutes an active matrix-type liquid crystal display device constituting a display unit of a small-sized electronic apparatus such as a projection-type projector, for example. As illustrated in FIG. 1, the electrooptic substrate 1 is configured by placing a counter substrate 20 (not illustrated in FIG. 2) on an element substrate 10. An electrooptic substance (not illustrated in FIG. 1 and FIG. 2) such as liquid crystal is filled into a space between the element substrate 10 and the counter substrate 20. Pixel electrodes (not illustrated) and Thin Film Transistor (TFT) elements (not illustrated) are arranged on a portion of a surface of the element substrate 10, which is overlapped with the counter substrate 20, in a matrix form. One terminal of three terminals of each TFT element is connected to each pixel electrode. Other two terminals of the three terminals of each TFT element are connected to a scan line (not illustrated) and a data line (not illustrated). The scan lines and data lines are arranged in a grid form so as to surround the pixel electrodes. Each scan line extends along an X direction in FIG. 2 and is drawn out in the X direction so as to be connected to a scan line control circuit (not illustrated). Each data line extends along a Y direction in FIG. 2 and is drawn out in the Y direction so as to be connected to any of mounting terminals 12-1, 12-2, 12-3 and 12-4 on a terminal portion 12 of the element substrate 10.

As illustrated in FIG. 2, the terminal portion 12 is provided along one side of the element substrate 10 (one side in the X direction in an example as illustrated in FIG. 2). As illustrated in FIG. 1, the mounting terminal 12-2 and the mounting terminal 12-1 are arranged at a short interval (for example, 1 mm) in a direction intersecting with the one side (that is, Y direction in FIG. 2) from the side closer to the counter substrate 20. As illustrated in FIG. 2, the mounting terminal 12-3 is provided so as to be aligned with the mounting terminal 12-1 in the direction of the above one side and the mounting terminal 12-4 is provided so as to be aligned with the mounting terminal 12-2 in the direction of the above one side. Although not illustrated in detail in FIG. 1 and FIG. 2, a data line which is connected to each of TFT elements arranged at lower left half among the TFT elements which are arranged on the element substrate 10 in a matrix form is connected to the mounting terminal 12-1. A data line which is connected to each of TFT elements arranged at upper left half among the TFT elements as described above is connected to the mounting terminal 12-2. Further, a data line which is connected to each of TFT elements arranged at lower right half among the TFT elements as described above is connected to the mounting terminal 12-3. A data line which is connected to each of TFT elements arranged at upper right half among the TFT elements as described above is connected to the mounting terminal 12-4.

Flexible substrates 30-$k$ (k=1 to 4) are bonded to the mounting terminals 12-$k$ (k=1 to 4) through anisotropic conductive films 40-$k$ (k=1 to 4) by thermocompression. Each of the flexible substrates 30-$k$ is obtained by forming polyimide into a film form, for example, and the data line control circuit (not illustrated) is mounted thereon. FIG. 1 illustrates a state where the flexible substrate 30-1 is connected to the mounting terminal 12-1 through the anisotropic conductive film 40-1 and a state where the flexible substrate 30-2 is connected to the mounting terminal 12-2 through the anisotropic conductive film 40-2. As illustrated in FIG. 1, the flexible substrate 30-2 connected to the mounting terminal 12-2 is arranged so as to be superimposed on the flexible substrate 30-1 connected to the mounting terminal 12-1. In a similar manner, the flexible substrate 30-4 connected to the mounting terminal 12-4 is arranged so as to be superimposed on the flexible substrate 30-3 connected to the mounting terminal 12-3.

Although not illustrated in detail in FIG. 1 and FIG. 2, connection portions between the mounting terminals 12-$k$ (k=1 to 4) and the flexible substrates 30-$k$ (k=1 to 4) are sealed by resin members for moisture-proofing, dust-proofing, and reinforcement. A characteristic of the electrooptic substrate 1 according to the embodiment is a method of how to coat resins forming the resin members.

Figure 3:
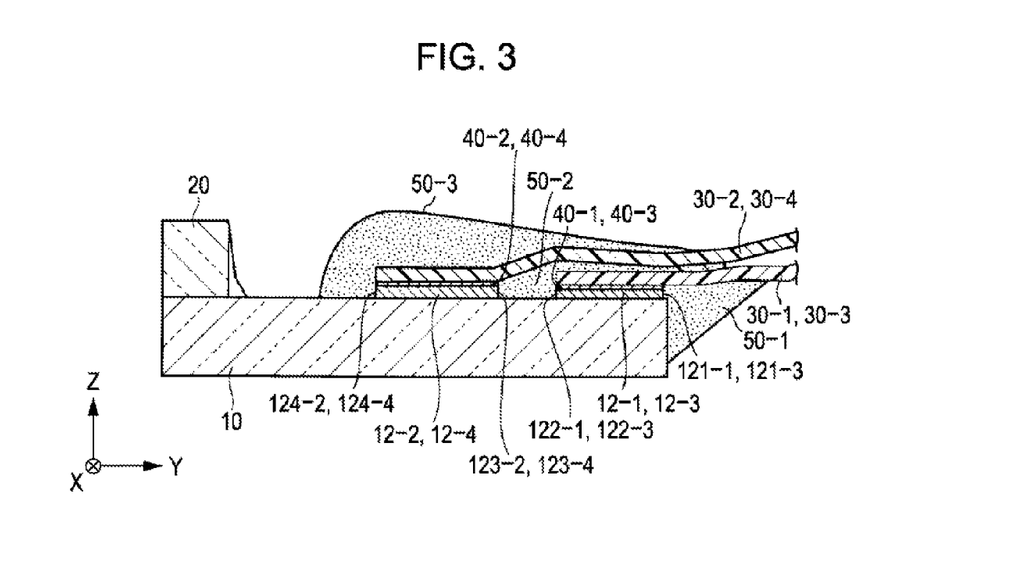
FIG. 3 is a left side view illustrating the electrooptic substrate in a state where sealing with a resin has been performed.

FIG. 3 is a side view illustrating the electrooptic substrate 1 in a state where connection portions between the mounting terminals 12-$k$ (k=1 to 4) and the flexible substrates 30-$k$ (k=1 to 4) are sealed by the resin members. As illustrated in FIG. 3, the electrooptic substrate 1 according to the embodiment has a resin member 50-1, a resin member 50-2, and a resin member 50-3. The resin member 50-1 covers a side face 121-1, which is farther from the counter substrate 20, of two side faces of the mounting terminal 12-1 extending in the X direction. The resin member 50-2 covers a side face 122-1 as the other side face (side face opposed to the side face 121-1) of the above two side faces, and a side face (side face 123-2) of two side faces of the mounting terminal 12-2 extending in the X direction, which is opposed to the side face 122-1. The resin member 50-3 covers a side face (side face 124-2) which is opposed to the side face 123-2 on the mounting terminal 12-2. As illustrated in FIG. 3, the resin member 50-1 is formed so as to cover portions of the element substrate 10 and the flexible substrate 30-1 each of which is continuous to the side face 121-1. The resin member 50-2 is formed so as to cover portions of the element substrate 10 and the flexible substrate 30-1 each of which is continuous to the side face 122-1 and portions of the element substrate 10 and the flexible substrate 30-2 each of which is continuous to the side face 123-2. Further, the resin member 50-3 is formed so as to cover portions of the element substrate 10 and the flexible substrate 30-2 each of which is continuous to the side face 124-2.

All of the resin members 50-1, 50-2, and 50-3 may be formed with materials having the same physical property. However, the resin member 50-2 may be formed by coating a resin having a lower viscosity (that is, high flowability) than those of the resin members 50-1 and 50-3. In the embodiment, a resin is coated on the portions of the element substrate 10 and the flexible substrate 30-1 each of which is continuous to the side face 122-1 with a dispenser or the like. After the resin has sufficiently flown to the portions of the element substrate 10 and the flexible substrate 30-2 each of which is continuous to the side face 123-2, the resin is cured by irradiation with ultraviolet rays or the like so as to form the resin member 50-2. Therefore, in certain embodiments a resin having a lower viscosity than those of the resin members 50-1 and 50-3 be used for the resin member 50-2.

Figure 4:
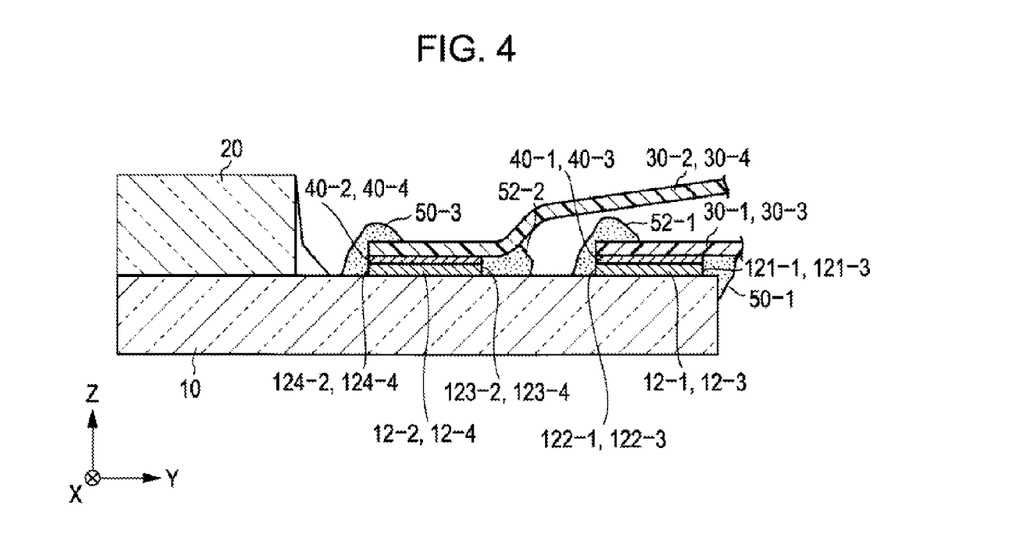
FIG. 4 is a view for illustrating an effect of an embodiment.

As described above, the electrooptic substrate 1 according to the embodiment has a characteristic that portions of the connection portions between each of the mounting terminals 12-1 and 12-2 and each of the flexible substrates 30-1 and 30-2, which are opposed to each other, are sealed by the common resin member 50-2. Note that the mounting terminals 12-1 and 12-2 and the flexible substrates 30-1 and 30-2 are aligned in the Y direction (data line extending direction) in FIG. 2. It is assumed that as illustrated in FIG. 4, the portions of the element substrate 10 and the flexible substrate 30-1 each of which is continuous to the side face 122-1 are sealed by a resin member 52-1 and the portions of the element substrate 10 and the flexible substrate 30-2 each of which is continuous to the side face 123-2 are sealed by a resin member 52-2. With this, the number of coatings of the resins is increased in comparison with that in the embodiment of FIG. 3. Further, in a mode as illustrated in FIG. 4, a thickness when the flexible substrates 30-1 and 30-2 are laminated is increased by the amount of thickness of the resin member 52-1. In other words, according to the embodiment of FIG. 3, a sealing process can be simplified and the thickness when the flexible substrates are laminated can be prevented from being increased in comparison with the case where the connection portions between the flexible substrates and the mounting terminals are sealed in the mode as illustrated in FIG. 4.

In addition, in the embodiment of FIG. 3, the connection portions between the mounting terminals and the flexible substrates, which are aligned in the X direction on the terminal portion 12, are sealed by the common resin member so that the number of coatings of the resin is further reduced and the sealing process is further simplified. For example, the resin member 50-1 is formed so as to cover the side face 121-3 of the mounting terminal 12-3. The portions of the element substrate 10 and the flexible substrate 30-1 each of which is continuous to the side face 121-3 are covered by the resin member 50-1. The resin member 50-2 is formed so as to cover the side face 122-3 of the mounting terminal 12-3 and the side face 123-4 of the mounting terminal 12-4. The portions of the element substrate 10 and the flexible substrate 30-3 each of which is continuous to the side face 122-3 and the portions of the element substrate 10 and the flexible substrate 30-4 each of which is continuous to the side face 123-4 are covered by the resin member 50-2. Further, the resin member 50-3 is formed so as to cover the side face 124-4 of the mounting terminal 12-4. The portions of the element substrate 10 and the flexible substrate 30-4 each of which is continuous to the side face 124-4 are covered by the resin member 50-3.

The electrooptic substrate 1 is configured as described above.

Manufacturing Method and Manufacturing Apparatus

Next, a method and an apparatus for manufacturing the electrooptic substrate 1 are described. It is to be noted that the method of manufacturing the electrooptic substrate 1 includes a process of manufacturing the element substrate 10, a process of bonding each of the flexible substrates 30-$k$ ($k$=1 to 4) on each of the mounting terminals 12-$k$ ($k$=1 to 4) through each of the anisotropic conductive films 40-$k$ ($k$=1 to 4) by thermocompression, and the like. These processes are not described in detail. Hereinafter, a sealing process of forming the resin members 50-$j$ ($j$=1 to 3) and a manufacturing apparatus for executing the sealing process are described.

Figure 5:
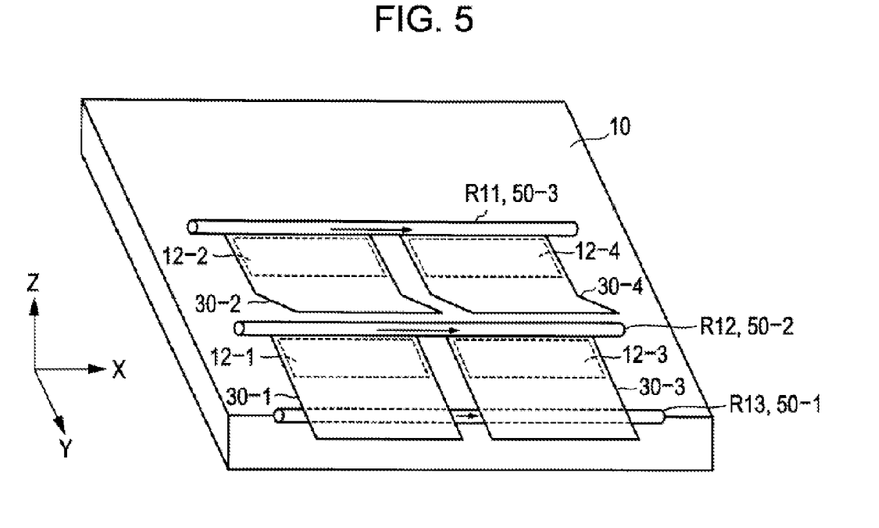
FIG. 5 is a view for illustrating a coating path of a sealing resin.

Various modes can be considered as coating paths when resins for forming the resin members 50-1, 50-2, and 50-3 are coated on the electrooptic substrate 1 in a state where each of the flexible substrates 30-$k$ ($k$=1 to 4) are bonded to each of the mounting terminals 12-$k$ ($k$=1 to 4) through each of the anisotropic conductive films 40-$k$ ($k$=1 to 4) by thermocompression as illustrated in FIG. 1 and FIG. 2. For example, a mode in which resins are coated so as to draw each of three coating paths R11, R12 and R13 as illustrated in FIG. 5 and the resin members 50-1, 50-2, and 50-3 are separately formed can be considered. In addition, a mode in which the resin members 50-1, 50-2 and 50-3 are formed by coating a resin continuously (in a single stroke manner without interruption) as illustrated in FIG. 6 or FIG. 7 can be also considered.

Figure 6:
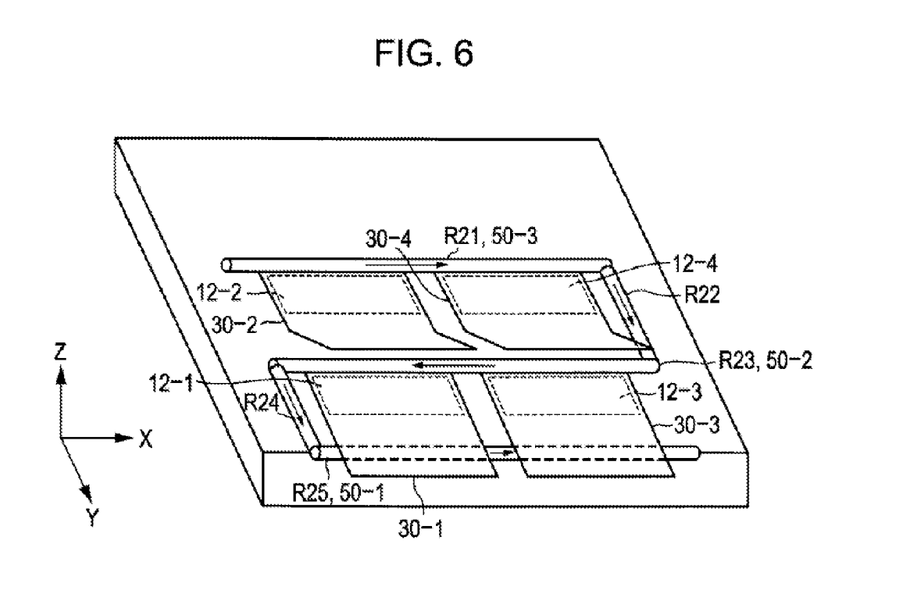
FIG. 6 is a view for illustrating another variation on the coating path.
Figure 7:
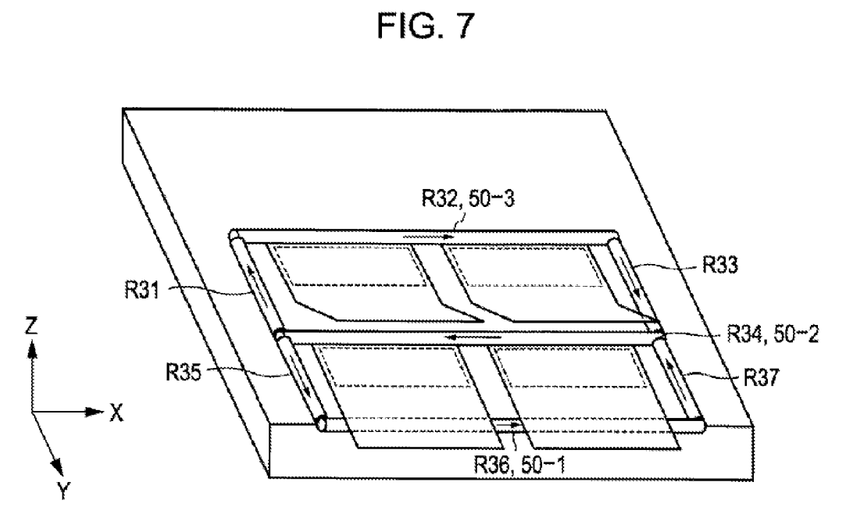
FIG. 7 is a view for illustrating still another variation on the coating path.

For example, in the mode as illustrated in FIG. 6, the resin members 50-3, 50-2, and 50-1 are formed in this order by continuously coating the resin without interruption so as to draw the coating paths R21, R22, R23, R24, and R25 in this order. On the other hand, in the mode as illustrated in FIG. 7, the resin members 50-3, 50-2, and 50-1 are formed in this order by continuously coating the resin without interruption so as to draw the coating paths R31, R32, R33, R34, R35, R36, and R37 in this order. Further, the resin members 50-2, 50-1, and 50-3 can be formed in this order by coating the resin so as to draw the coating paths R34, R35, R36, and R37 in this order in FIG. 7, and then, draw the coating paths R33, R32, and R31 in the direction opposite to the example as illustrated in FIG. 7. In the modes as illustrated in FIG. 6 and FIG. 7, the resin is coated on some of the side faces of the connecting portions, which extend in the Y direction, in comparison with the mode as illustrated in FIG. 5. Therefore, in the modes as illustrated in FIG. 6 and FIG. 7, it can be considered that effects of moisture-proofing, dust-proofing, and reinforcement on the connection portions are enhanced so as to improve reliability in comparison with the mode as illustrated in FIG. 5. However, it is not necessarily essential that the resin be coated on the side faces extending in the Y direction.

Various modes can be also considered in formation order of the resin members 50-1, 50-2, and 50-3. However, in certain embodiments the resin member 50-2 may be formed first with respect to the relation between the resin members 50-2 and 50-3. The reason is as follows. As described above, in the electrooptic substrate 1 according to the embodiment, the flexible substrate 30-2 is superimposed on the flexible substrate 30-1 and the flexible substrate 30-4 is superimposed on the flexible substrate 30-3. Therefore, when the resin member 50-2 is formed, it is necessary that the flexible substrate 30-2 and the flexible substrate 30-4 be lifted to coat the resin. It is assumed that the resin member 50-3 is formed before the resin member 50-2 is formed. Thus, when the flexible substrate 30-2 (or the flexible substrate 30-4) is lifted, there arises a risk that the resin member 50-3 is stripped off from the mounting terminal 12-2 (or, mounting terminal 12-4). Therefore, in one embodiment, the resin member 50-2 is formed before the resin member 50-3 is formed.

Further, when the resin member 50-1 is formed, the resin may be coated from a back side of the electrooptic substrate 1. If the resin is coated from the surface side of the electrooptic substrate 1, it is necessary that all of the flexible substrates 30-$k$ ($k$=1 to 4) are lifted and there arises a risk that the flexible substrates 30-$k$ are stripped off. For this reason, when the resin member 50-1 is formed, the resin may be coated from the back side of the electrooptic substrate 1. Therefore, for example, when the resin is coated by using a conventional manufacturing apparatus which holds the electrooptic substrate 1 horizontally and discharges the resin downward in the vertical direction only, it is necessary that the electrooptic substrate 1 is turned back to form the resin member 50-1. Accordingly, when the resin is coated by using a conventional manufacturing apparatus, in one embodiment the resin member 50-1 is formed first or last. The resin members 50-2 and 50-3 are necessary to be formed by coating the resins from the surface side of the electrooptic substrate 1. If the resin member 50-1 is formed second, operations of inverting front and rear sides of the electrooptic substrate 1 are required to be performed twice.

As described above, in the mode in which the resin members 50-$j$ ($j$=1 to 3) are formed by using a conventional manufacturing apparatus, an operation is required to be performed by turning back the electrooptic substrate 1 at least once when the resin member 50-1 is formed. Therefore, the resin members 50-$j$ ($j$=1 to 3) cannot be formed in the mode in which the resin is coated in a single stroke manner as illustrated in FIG. 6 or FIG. 7. A specific example of a manufacturing apparatus with which the resin is coated in a single stroke manner as illustrated in FIG. 6 or FIG. 7 so as to form the resin members 50-$j$ ($j$=1 to 3) is described with reference to the drawings.

Figure 8:
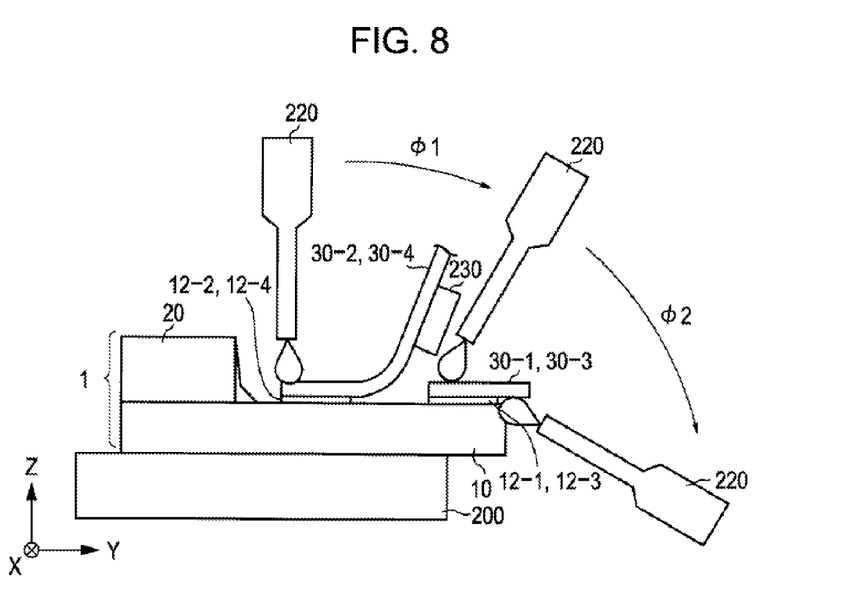
FIG. 8 is a view for illustrating a dispenser device for forming resin members and a sealing process using the dispenser device.

A manufacturing apparatus as illustrated in FIG. 8 has a panel adsorption stage 200, a discharge nozzle 220 and a supporting plate member 230. The panel adsorption stage 200 fixes the electrooptic substrate 1 horizontally. The discharge nozzle 220 can adjust a discharge angle of a resin and has an elongated pipe-shaped discharge port. The supporting plate member 230 moderately lifts and holds the flexible substrates 30-2 and 30-4. In the manufacturing apparatus as illustrated in FIG. 8, the resin members 50-$j$ ($j$=1 to 3) can be formed in a single stroke manner by coating the resin so as to draw a coating path as illustrated in FIG. 6 with the following procedures. At first, the flexible substrates 30-2 and 30-4 are moderately lifted and held by the supporting plate member 230. Since the discharge port of the discharge nozzle 220 is formed into the elongated pipe shape, the resin member 50-2 can be formed without largely lifting the flexible substrates 30-2 and 30-4. If the flexible substrates 30-2 and 30-4 are largely lifted, there arises the risk that the electrooptic substrate 1 is broken (the flexible substrates 30-2 and 30-4 are stripped off from the mounting terminals) as described earlier. The embodiment has a characteristic that the electrooptic substrate 1 is not broken easily in a process of forming the resin member 50-2 since the resin member 50-2 can be formed without largely lifting the flexible substrates 30-2 and 30-4. It is to be noted that in the embodiment, the flexible substrates 30-2 and 30-4 are lifted so as to be supported from the lower side with the supporting plate member 230. Alternatively, the flexible substrates 30-2 and 30-4 may be lifted by sandwiching the flexible substrates 30-2 and 30-4 with a plate-like member and the supporting plate member 230. In this case, the supporting plate member 230 and the plate-like member are paired.

Next, an operation position of the discharge nozzle 220 is determined such that the discharge nozzle 220 discharges the resin to an origin of the coating path R21 in FIG. 6 downward in the vertical direction. Further, the discharge nozzle 220 is moved to a terminal of the coating path R21 in FIG. 6 (in an example as illustrated in FIG. 8, to a rear side from a front side in the X direction) while making the discharge nozzle 220 discharge the resin. With this, the resin member 50-3 is formed. Subsequently, the discharge nozzle 220 is swung (swung by an angle of $\phi 1$ in the clockwise direction in the example as illustrated in FIG. 8) from the terminal of the coating path R21 in FIG. 6 to an origin of the coating path R23 in FIG. 6 while making the discharge nozzle 220 discharge the resin so as to draw the coating path R22 in FIG. 6. Further, the discharge nozzle 220 is moved (in the example as illustrated in FIG. 8, to the rear side from the front side in the X direction) so as to draw the coating path R23 in FIG. 6 while making the discharge nozzle 220 discharge the resin so as to draw the coating path R23 in FIG. 6. With this, the resin member 50-2 is formed. Then, the discharge nozzle 220 is swung by a discharge angle of $\phi 2$ (see, FIG. 8) in the clockwise direction while making the discharge nozzle 220 discharge the resin so as to draw the coating path R24 in FIG. 6. Further, the discharge nozzle 220 is moved to the rear side from the front side in the X direction in FIG. 8 while making the discharge nozzle 220 discharge the resin so as to draw the coating path R25 in FIG. 6. With this, the resin member 50-1 is formed.

In this manner, with the manufacturing apparatus as illustrated in FIG. 8, each process of forming the resin member 50-2 (or 50-3) and the process of forming the resin member 50-1 can be executed without turning back the electrooptic substrate 1 and the resin can be coated in a single stroke manner so as to form the resin members 50-$j$ ($j$=1 to 3). In addition, if a discharge angle of the discharge nozzle 220 is adjusted by computer control, the sealing process of the electrooptic substrate 1 can be automated.

Figure 9A:
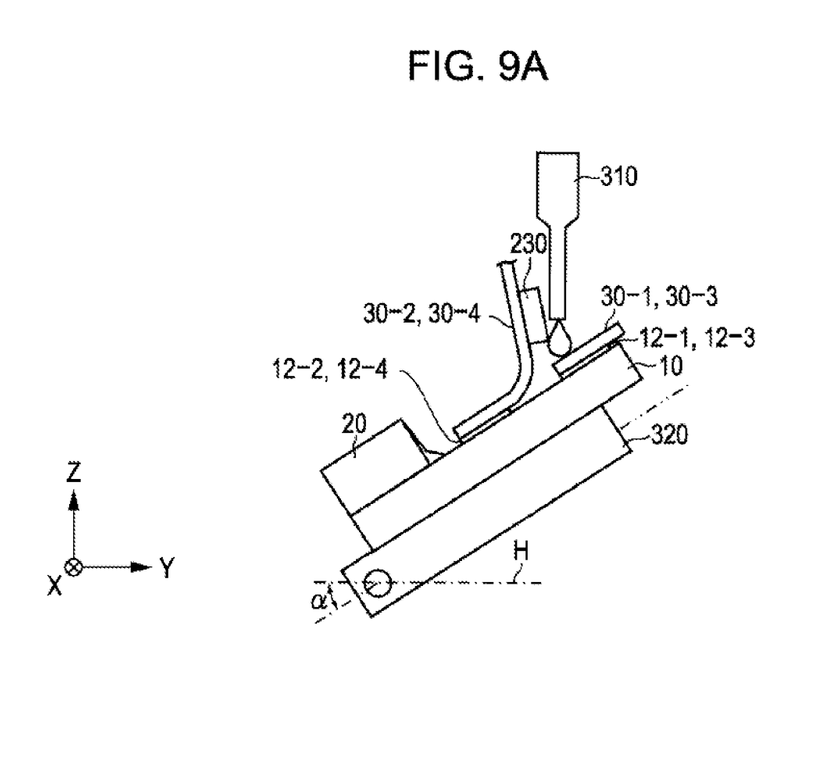
FIGS. 9A and 9B are views for illustrating a variation on the dispenser device.
Figure 9B:
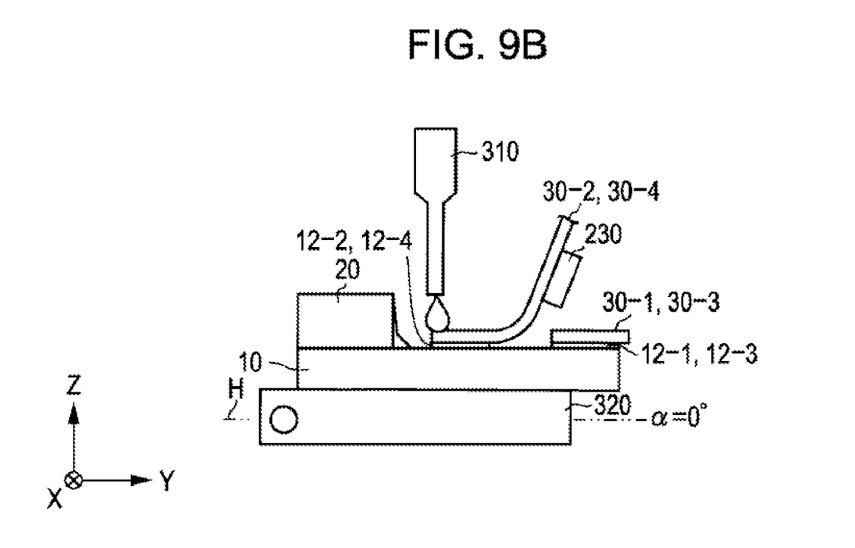

A manufacturing apparatus as illustrated in FIGS. 9A and 9B has a discharge nozzle 310, a panel adsorption stage 320, and the supporting plate 230. The discharge nozzle 310 discharges the resin downward in the vertical direction. The panel adsorption stage 320 can fix the electrooptic substrate 1 in a state of being inclined at an arbitrary angle with respect to a horizontal face. The supporting plate 230 lifts the flexible substrates 30-2 and 30-4. With such manufacturing apparatus, as illustrated in FIGS. 9A and 9B, in each process of forming the resin members 50-$j$ ($j$=1 to 3), each process can be executed without turning back the electrooptic substrate 1 by adjusting an angle $\alpha$ between the panel adsorption stage 320 to which the electrooptic substrate 1 is fixed and a horizontal face H such that a discharge direction of the resin by the discharge nozzle 310 faces to a portion of the electrooptic substrate 1 on which the resin is to be coated. Therefore, with the manufacturing apparatus as illustrated in FIGS. 9A and 9B, the resin can be also coated in a single stroke manner so as to form the resin members 50-$j$ ($j$=1 to 3). In addition, with the manufacturing apparatus as illustrated in FIGS. 9A and 9B, if the angle between the panel adsorption stage 320 and the horizontal face H is adjusted by computer control, the sealing process of the electrooptic substrate 1 can be also automated.

B. VARIATIONS

Hereinbefore, embodiments of the disclosure have been described. However, other variations are, of course, possible such as the following.

Figure 10:
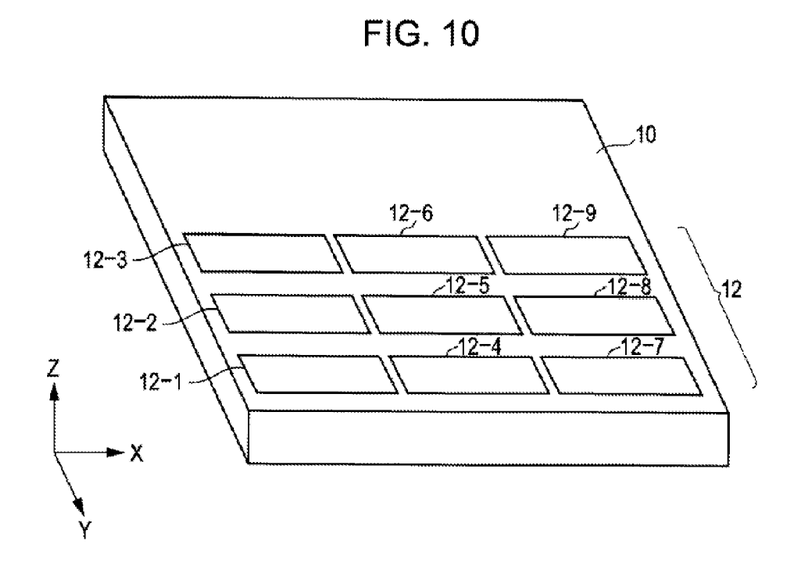
FIG. 10 is a view for illustrating an electrooptic substrate according to a first variation of the disclosure.
Figure 11:
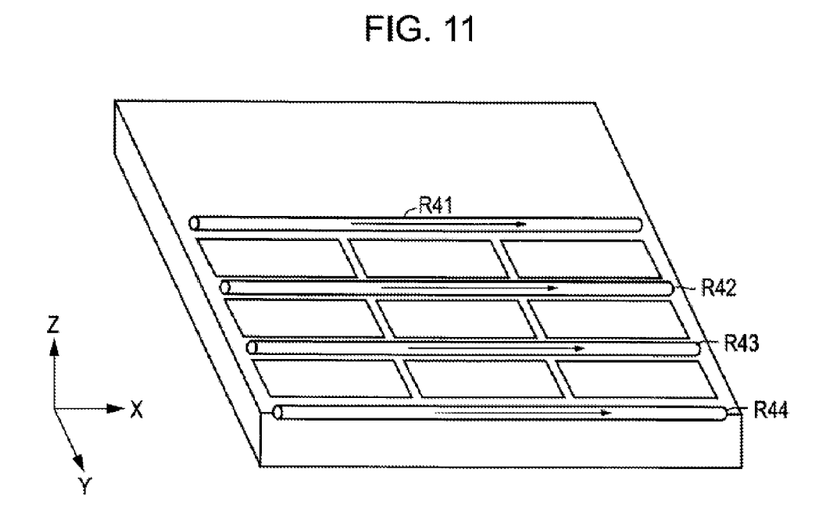
FIG. 11 is a view for illustrating a coating path of a sealing resin in a sealing process of the electrooptic substrate according to a first variation.
Figure 12:
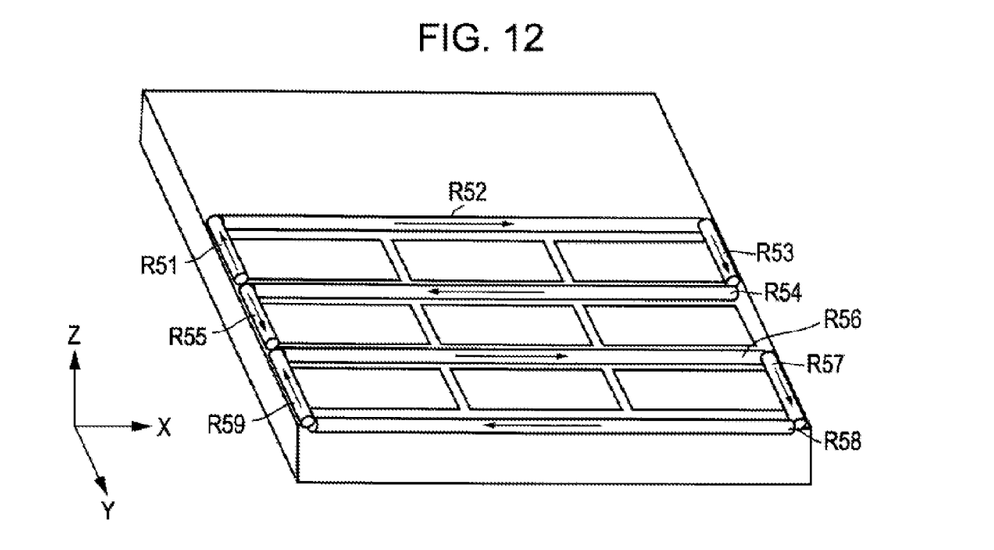
FIG. 12 is a view for illustrating a variation of the coating path.

In above embodiments, four mounting terminals to which the respective flexible substrates are bonded are arranged on the terminal portion 12 of the electrooptic substrate 1 in a matrix form. However, the mounting terminals may be arranged in a matrix form of 3×3 as illustrated in FIG. 10. Further, the mounting terminals may be arranged in a matrix form of M×N (M indicates the arrangement number of mounting terminals in the extending direction of data lines and N indicates the arrangement number of mounting terminals in the extending direction of scan lines: N is an arbitrary natural number and M is an arbitrary natural number of equal to or larger than 2). In the mode in which the mounting terminals are arranged in a matrix form of 3×3 as illustrated in FIG. 10, it is sufficient that resin members which protect connection portions between the mounting terminals and the flexible substrates are formed separately by coating resins so as to draw coating paths R41 to R43 as illustrated in FIG. 11 or is formed by coating the resin in a single stroke manner so as to draw coating paths R51 to R59 as illustrated in FIG. 12 in this order.

In above embodiments, an application example in which the disclosure is applied to mounting of a flexible substrate on which a data line control circuit is mounted has been described. However, the disclosure may be applied to mounting of a flexible substrate on which a scan line control circuit is mounted.

In above embodiments, a three-terminal element represented by a TFT is used as a switching element of a pixel circuit. However, the switching element of the pixel circuit may be formed by a two-terminal element such as a diode. Note that when the two-terminal element is used as the switching element of the pixel circuit, it is necessary that a scan line is formed on one substrate, a data line is formed on the other substrate, and the two-terminal element is formed between either of the scan line or the data line and the pixel electrode. In this case, the pixel circuit is constituted by the two-terminal element which is connected in series between the scan line and the data line and liquid crystal.

Further, in above embodiments, an active matrix-type liquid crystal display device has been described as an example of an electrooptic device including the electrooptic substrate 1. However, the disclosure is not limited thereto and may be applied to a passive-type using Super Twisted Nematic (STN) liquid crystal or the like. Further, above embodiments may be applied to an electrooptic device having an organic light emitting diode element as a light emitting element, which uses an organic Electro Luminescent (EL) as an electrooptic substance. In addition, the disclosure is also applied to an electrooptic panel using electrooptic substances other than the organic EL. The electrooptic substance is a substance of which optical characteristics such as transmissivity and luminance are changed by supply of an electric signal (current signal or voltage signal). For example, the disclosure may also be applied to various types of electrooptic panels in a similar manner as the above embodiments. For example, the disclosure can be applied to a display panel using liquid crystal or light emitting polymer as the electrooptic substance, an electrophoresis display panel using a microcapsule including colored liquid and white particles dispersed in the liquid as the electrooptic substance, a twist ball display panel using twist balls which are colored with different colors for regions having different polarities as the electrooptic substance, a toner display panel using black toner as the electrooptic substance, or a plasma display panel using high-pressure gas such as helium or neon as the electrooptic substance.

C. APPLICATION EXAMPLES

Figure 13:
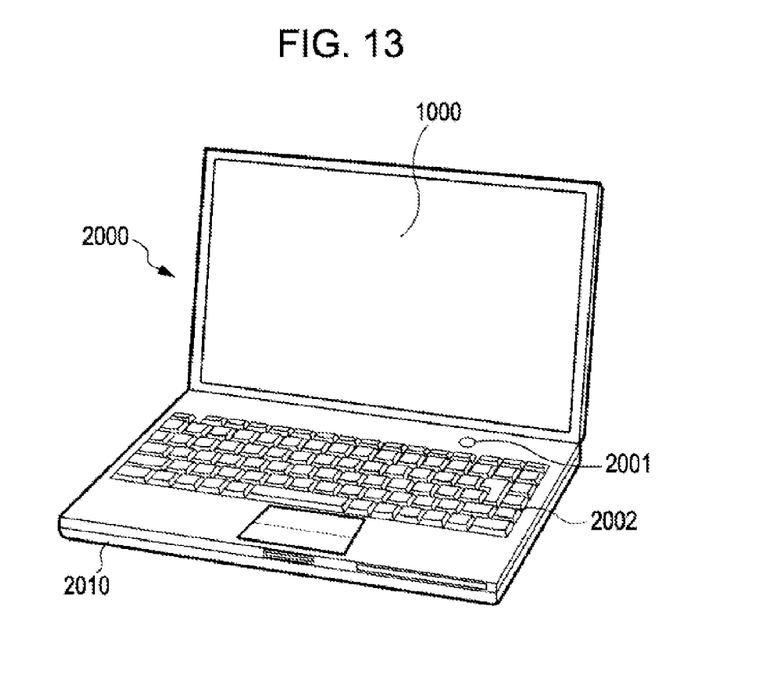
FIG. 13 is a perspective view illustrating a configuration of a personal computer to which the electrooptic device is applied.

Next, an electronic apparatus to which an electrooptic device 1000 having the electrooptic substrate 1 according to the above embodiment and variations is applied is described. FIG. 13 illustrates a mobile personal computer to which the electrooptic device 1000 is applied. A personal computer 2000 includes the electrooptic device 1000 as a display unit and a main body 2010. A power switch 2001 and a keyboard 2002 are provided on the main body 2010.

Figure 14:
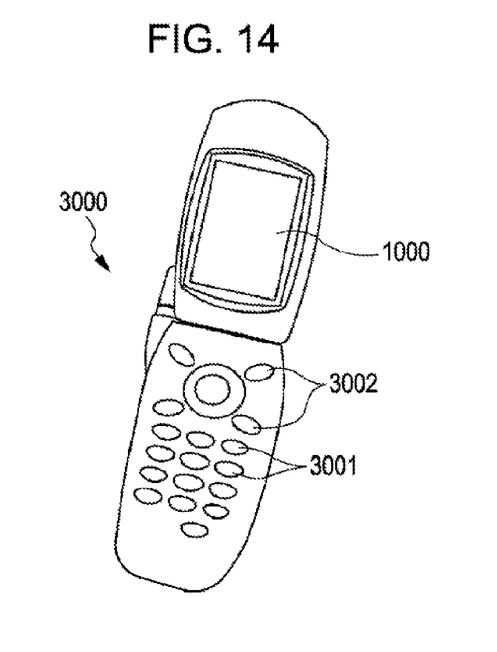
FIG. 14 is a perspective view illustrating a configuration of a mobile phone to which the electrooptic device is applied.

FIG. 14 illustrates a configuration of a mobile phone to which the electrooptic device 1000 is applied. A mobile phone 3000 includes a plurality of operation buttons 3001 and scroll buttons 3002 and the electrooptic device 1000 as a display unit. A screen which is displayed on the electrooptic device 1000 is scrolled by operating the scroll buttons 3002.

Figure 15:
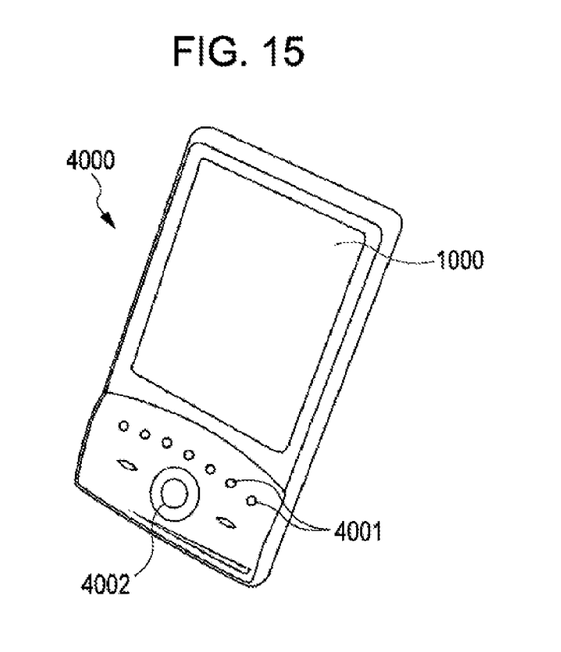
FIG. 15 is a perspective view illustrating a configuration of a personal digital assistant to which the electrooptic device is applied.

FIG. 15 illustrates a configuration of a personal digital assistant (PDA) to which the electrooptic device 1000 is applied. A personal digital assistant 4000 includes a plurality of operation buttons 4001, a power switch 4002, and the electrooptic device 1000 as a display unit. Various pieces of information such as an address book and a schedule book are displayed on the electrooptic device 1000 by operating the power switch 4002.

Figure 16:
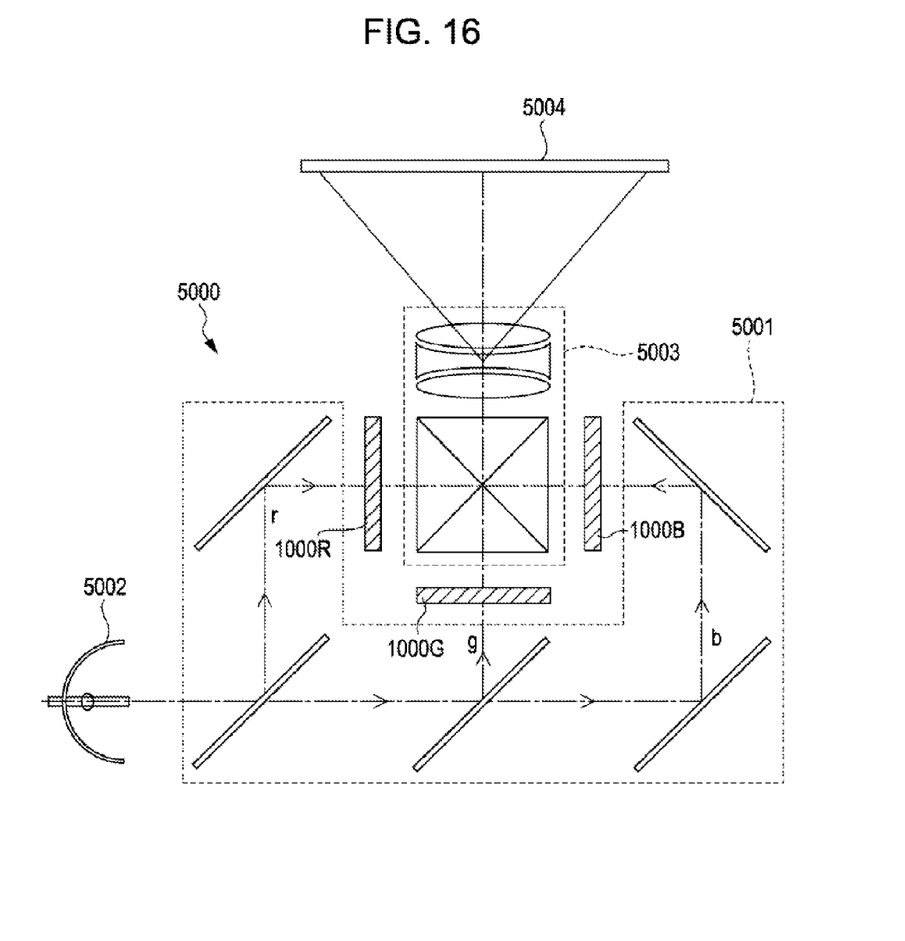
FIG. 16 is a perspective view illustrating a projection-type display apparatus to which the electrooptic device is applied.

FIG. 16 is a plan view schematically illustrating a projection-type display device (three-panel projector) 5000 to which the electrooptic device 1000 is applied. The projection-type display device 5000 includes three electrooptic devices 1000 (1000R, 1000G, 1000B) corresponding to different display colors (red, green, blue). An illumination optical system 5001 supplies a red component "r" of emitted light from an illumination device (light source) 5002 to the electrooptic device 1000R, supplies a green component "g" to the electrooptic device 1000G, and supplies a blue component "b" to the electrooptic device 1000B. Each electrooptic device 1000 functions as a light modulator (light bulb) which modulates each single color light supplied from the illumination optical system 5001 in accordance with a display image. A projection optical system 5003 synthesizes the emitted lights from each electrooptic device 1000 so as to project the synthesized emitted light onto a projection face 5004.

It is to be noted that electronic apparatuses to which the electrooptic device 1000 is applied include a digital still camera, a liquid crystal television, a view finder-type and a direct monitoring-type video tape recorder, a car navigation system, a pager, an electronic organizer, a calculator, a word processor, a workstation, a videophone, a POS terminal, a device including a touch panel, and the like in addition to the apparatuses illustrated in FIGS. 13 to 16. Further, the above-described electrooptic device can be applied as a display portion of each of these various electronic apparatuses. Therefore, it is manifestly intended that embodiments in accordance with the present disclosure be limited only by the claims and the equivalents thereof.

What is claimed is:
1. An electrooptic device comprising:
a terminal portion provided on at least a one side of an electrooptic substrate;
first and second mounting terminals arranged on the terminal portion so as to be aligned in a direction intersecting with the one side;
a first flexible substrate connected to the first mounting terminal;
a second flexible substrate connected to the second mounting terminal and arranged so as to be superimposed on the first flexible substrate;

a first resin member which covers a part of the first flexible substrate and a part of a side face of the electrooptic substrate;

a second resin member which covers a part of the first flexible substrate at a position between the first flexible substrate and the second flexible substrate; and a third resin member which covers a part of the second flexible substrate.

2. The electrooptic device according to claim 1, further including:

a third mounting terminal arranged on the terminal portion so as to be aligned with the first mounting terminal in a direction of the one side;

a fourth mounting terminal arranged on the terminal portion so as to be aligned with the second mounting terminal in the direction of the one side;

a third flexible substrate connected to the third mounting terminal; and a fourth flexible substrate connected to the fourth mounting terminal and arranged so as to be superimposed on the third flexible substrate, wherein the first resin member covers a part of the third flexible substrate and a part of the side surface of the electrooptic substrate, the second resin member covers a part of the third flexible substrate at a position between the third flexible substrate and the fourth flexible substrate, and the third resin member covers a part of the fourth flexible substrate.

3. The electrooptic device according to claim 1, wherein the second resin member comprises a resin having a lower viscosity in comparison with a viscosity of the first resin member and the third resin member.

4. The electrooptic device according to claim 1, wherein the first, second, and third resin members are comprised of a single stroke of a continuous resin coating without interruption.

5. An electronic apparatus including the electrooptic device according to claim 1.

6. An electrooptic device comprising:

a first substrate having a first side;

a second substrate having a second side that protrudes from the first side of the first substrate;

a first mounting terminal arranged on the second substrate between the first side and the second side in a plan view;

a second mounting terminal arranged on the second substrate between the first side and the first mounting terminal in the plan view;

a first flexible substrate connected to the first mounting terminal, the first flexible substrate having a first surface that faces the second substrate and a second surface that is opposed to the first surface;

a second flexible substrate connected to the second mounting terminal and arranged so as to be superimposed on the first flexible substrate, the second flexible substrate having a third surface that faces the second substrate and a fourth surface that is opposed to the third surface;

a first resin member that covers a part of the first surface and a part of the second substrate;

a second resin member that covers a part of the second surface, a part of the third surface and a part of the second substrate; and a third resin member that covers a part of the fourth surface and a part of the second substrate.

* * * * *